(12) United States Patent
Miyazawa

(10) Patent No.: US 7,959,299 B2
(45) Date of Patent: Jun. 14, 2011

(54) PROJECTOR HAVING REDUCED COLOR SHADING

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 594 days.

(21) Appl. No.: 12/050,578

(22) Filed: Mar. 18, 2008

(65) Prior Publication Data
US 2009/0002633 A1    Jan. 1, 2009

(30) Foreign Application Priority Data

Mar. 22, 2007 (JP) ................. 2007-074140
Dec. 4, 2007 (JP) ................. 2007-313144

(51) Int. Cl.
G03B 21/00 (2006.01)
G03B 21/14 (2006.01)
G03B 21/26 (2006.01)
G02F 1/1335 (2006.01)

(52) U.S. Cl. ............... 353/34; 353/31; 353/82; 353/94; 349/7; 349/8

(58) Field of Classification Search .......... 353/20, 353/30–31, 33–34, 48, 82, 94, 122; 348/338–339; 349/80, 96, 194, 7–9
See application file for complete search history.

(56) References Cited

U.S. PATENT DOCUMENTS

| | | | | |
|---|---|---|---|---|
| 6,144,420 | A * | 11/2000 | Jung | 349/8 |
| 7,471,822 | B2 * | 12/2008 | Roth et al. | 382/162 |
| 7,872,216 | B2 * | 1/2011 | Miyazawa | 250/208.1 |
| 2004/0246389 | A1 * | 12/2004 | Roth | 349/5 |
| 2008/0259231 | A1 * | 10/2008 | Miyazawa | 349/8 |
| 2010/0225885 | A1 * | 9/2010 | Miyazawa | 353/20 |

FOREIGN PATENT DOCUMENTS

| | | |
|---|---|---|
| JP | A-1-126678 | 5/1989 |
| JP | A-2-153336 | 6/1990 |
| JP | A-3-294841 | 12/1991 |
| JP | U-3-119816 | 12/1991 |
| JP | A-5-107639 | 4/1993 |
| JP | A-5-224173 | 9/1993 |

* cited by examiner

Primary Examiner — Tony Ko
Assistant Examiner — Jori S Reilly-Diakun
(74) Attorney, Agent, or Firm — Oliff & Berridge, PLC

(57) ABSTRACT

A projector including a lighting device for emitting light including first, second and third colored light beams. A first dichroic mirror separates the light into the first colored light beam by reflecting the light in a certain wavelength range and transmitting the light in another wavelength range and transmitting the light in another wavelength range. A second dichroic mirror separates the other colored light beams into the second and third colored light beams by reflecting the light in a certain wavelength range and transmitting the light in another wavelength range. The second dichroic mirror separates the light from the lighting device into the colored light beams. The projector including a first color combining optical system for combining the colored light beams to emit a first image light beam.

12 Claims, 11 Drawing Sheets

SLIGHTLY CONVERGING
INCIDENT LIGHT BEAM
SLIGHTLY DIVERGING
INCIDENT LIGHT BEAM
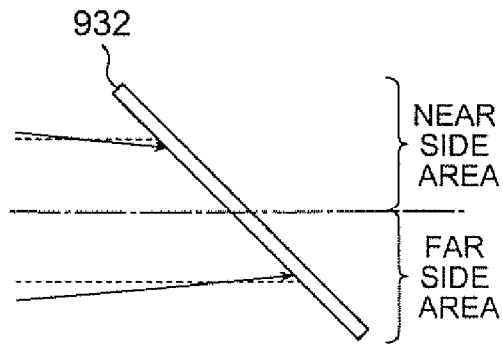
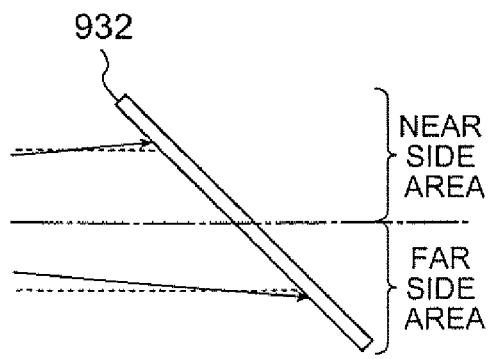
FIG.11A
FIG.11B
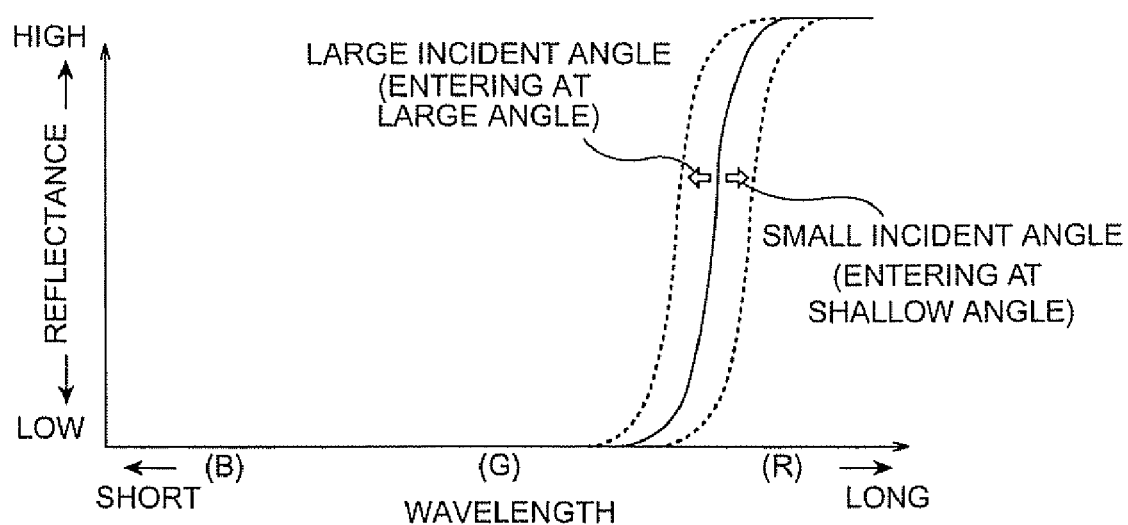
FIG.12

PROJECTOR HAVING REDUCED COLOR SHADING

This application claims priority from Japanese Patent Application No. 2007-074140 filed in the Japanese Patent Office on Mar. 22, 2007 and Japanese Patent Application No. 2007-313144 filed in the Japanese Patent Office on Dec. 4, 2007, the entire disclosures of which are hereby incorporated by reference in their entireties.

BACKGROUND

1. Technical Field

The present invention relates to a projector.

2. Related Art

In the past, there has been known a method of performing stacked projection of the same image on one screen (projection screen) using two projectors (see e.g., JP-A-5-107639 (Document 1)). The image light thus projected by the stacked projection is roughly doubled in luminance, thus the image light projected on the screen becomes extremely bright.

However, in the case of performing the stacked projection as described above, it is not so easy to accurately overlap the image light beams from the two projectors on the screen. If the image light beams from the two projectors are not accurately overlapped, the image quality of the projection image is degraded.

As a projector in the related art capable of solving such a problem, there is proposed a projector provided with a polarization splitting optical system for splitting a light beam from a lighting device into a light beam having a first polarization component and a light beam having a second polarization component to emit the light beams respectively towards two image forming units, and a polarization combining optical system for combining the image light beams from the two image forming units (see e.g., JP-A-1-126678 (Document 2)).

According to the projector in the related art, because the light beam from the lighting device is split into the first light beam having the first polarization component and the light beam having the second polarization component to form the image light beams in the respective image forming units, and then the two image light beams are combined by the polarization combining optical system to project the combined light beam on the screen by one projection optical system, it becomes possible to accurately overlap the image light beams from the two image forming units on the screen. As a result, it becomes possible to prevent degradation of the image quality of the projection image.

However, according to research conducted by the inventors of the present invention, it proved that in the projector in the related art, even if the in-plane light intensity distribution of the light beam emitted from the lighting device was equalized using a light equalizing optical system such as a lens integrator, color shading occurred in a lateral direction (a horizontal direction) in the image light beam projected on the screen. If the color shading occurs in the lateral direction (the horizontal direction) in the image light beam projected on the screen, the image quality of the projection image is problematically degraded.

SUMMARY

An advantage of some aspects of the invention, therefore, is to provide a projector capable of preventing the color shading in the lateral direction in the image light beam projected on the projection surface from occurring, thereby preventing the degradation of the image quality of the projection image.

In order for obtaining the advantage described above, the inventors conducted thorough research of causes of occurrence of the color shading in the lateral direction (the horizontal direction) in the image light beam projected on the screen in the projector in the related art. As a result, there was obtained a finding that the cause was a complex combination of four factors, "(1) the dichroic mirror is disposed at an angle of 45 degree with the system optical axis," "(2) the light beam entering the dichroic mirror is not a perfectly parallel light beam," "(3) the spectral characteristic of the dichroic mirror varies correspondingly to the incident angle of the light beam," "and "(4) with respect to the two image light beams respectively emitted from the two image forming units, when focusing attention on the same colored light beam, the colored light beam reflected or transmitted in a near side area of a first dichroic mirror and the colored light beam reflected or transmitted in a near side area of a third dichroic mirror are projected on the projection surface on one side in the lateral direction while the colored light beam reflected or transmitted in a far side area of the first dichroic mirror and the colored light beam reflected or transmitted in a far side area of the third dichroic mirror are projected on the projection surface on the other side in the lateral direction." Hereinafter, detailed explanations will be presented with reference to FIGS. 10 through 13.

FIG. 10 is a diagram schematically showing an optical system of a projector 900 of the related art.

FIGS. 11A and 11B are diagrams provided for explaining a problem of the projector 900 of the related art. FIG. 11A is a diagram schematically showing an angle of the light beam when a slightly converging light beam enters the first dichroic mirror 932, and FIG. 11B is a diagram schematically showing an angle of the light beam when a slightly diverging light beam enters the first dichroic mirror 932.

FIG. 12 is a diagram provided for explaining the spectral characteristic of the first dichroic mirror 932.

FIG. 13 is a diagram schematically showing light paths of light beams passing through the projector 900 of the related art. In FIG. 13, a light path of a light beam entering a near side area along the system optical axis of the first dichroic mirror 932 is denoted with open circles "○," a light path of a light beam entering a far side area along the system optical axis of the first dichroic mirror 932 is denoted with filled circles "●," a light path of a light beam entering a near side area along the system optical axis of the third dichroic mirror 962 is denoted with open triangles "△," a light path of a light beam entering a far side area along the system optical axis of the third dichroic mirror 962 is denoted with filled circles "▲," It should be noted that in FIG. 13, some optical elements in the lighting device 910, entrance side lenses and relay lenses in relay optical systems 936, 966, light modulation elements 940R, 940G, 940B, 970R, 970G, and 970B, and projection optical system 992 shown in FIG. 10 are omitted from illustration for the sake of simplification of the drawing.

It should also be noted that although the projector 900 in the related art described below is different from the projector described in the Document 2 in that the colored light beams reflected or transmitted by the first through the fourth dichroic mirrors are different, and that cross dichroic prisms are used as the color combining optical system instead of cross dichroic mirrors, the projector 900 has a similar configuration to that of the projector described in Document 2 in the other points, and consequently do not cause any problems in explaining the four factors described above.

As shown in FIG. 10, the projector 900 in the related art is provided with a lighting device 910, a polarization splitting mirror 912 as the polarization splitting optical system, two image forming units 920, 950, a polarization combining prism 990 as the polarization combining optical system, and the projection optical system 992. The color separating optical system 930 in the image forming unit 920 has the first dichroic mirror 932 and the second dichroic mirror 934, while the color separating optical system 960 in the image forming unit 950 has the third dichroic mirror 962 and the fourth dichroic mirror 964. The first dichroic mirror 932 and the third dichroic mirror 962 have a function of reflecting red light beam and transmitting other colored light beams (a blue light beam and a green light beam), and the second dichroic mirror 934 and the fourth dichroic mirror 964 has a function of reflecting the green light beam and transmitting the blue light beam. Each of the dichroic mirrors 932, 934, 962, and 964 is disposed at an angle of 45 degrees with the system optical axis.

In the projector 900 of the related art, even if the in-plane intensity distribution of the light beam emitted from the lighting device is equalized using the light equalizing optical system, it is quite difficult to perfectly collimate the light beam from the lighting device 910. Therefore, the incident light beam of each of the dichroic mirrors 932, 934, 962, and 964 is not a perfectly collimated light beam but is a slightly converging light beam or a slightly diverging light beam.

For example, in the case in which the slightly converging light beam enters the first dichroic mirror 932, as shown in FIG. 11A, the light beam enters the near side (the side nearer to the lighting device 910) area (hereinafter also referred to simply as "the near side area") along the system optical axis in the first dichroic mirror 932 at a shallow angle with the mirror surface of the first dichroic mirror 932, and the light beam enters the far side (the side further than the lighting device 910) area (hereinafter also referred to simply as "the far side area") along the system optical axis in the first dichroic mirror 932 at a deep angle with the mirror surface of the first dichroic mirror 932. Further, in the case in which the slightly diverging light beam enters the first dichroic mirror 932, as shown in FIG. 11B, the light beam enters the near side area of the first dichroic mirror 932 at a deep angle with the mirror surface of the first dichroic mirror 932, and the light beam enters the far side area of the first dichroic mirror 932 at a shallow angle with the mirror surface of the first dichroic mirror 932.

As described above, because the spectral characteristic of the first dichroic mirror 932 varies correspondingly to the incident angle of the light beam as shown in FIG. 12 in addition to the fact that the angle of the light beam entering the near side area in the first dichroic mirror 932 and the angle of the light beam entering the far side area therein become different from each other, there should be caused a difference in the light intensity between the red light beam reflected in the near side area of the first dichroic mirror 932 and the red light beam reflected in the far side area thereof.

It should be noted that the explanation is presented exemplifying the first dichroic mirror 932, the same applies to other dichroic mirrors 934, 962, and 964.

In this case, because each of the optical elements forming the projector 900 is arranged as shown in FIG. 10, with respect to the composite light beam emitted from the polarization combining prism 990, as shown in FIG. 13, the light beam (see the light path of "○") reflected or transmitted in the near side area of the first dichroic mirror 932 is overlapped with the light beam (see the light path of "Δ") reflected or transmitted in the near side area of the third dichroic mirror 962, and the light beam (see the light path of "●") reflected or transmitted in the far side area of the first dichroic mirror 932 is overlapped with the light beam (see the light path of "▲") reflected or transmitted in the far side area of the third dichroic mirror 962.

Therefore, because the difference in the light intensity (the light intensity variation) caused between the red light beam reflected in the near side area of the first dichroic mirror 932 and the red light beam reflected in the far side area thereof and the difference in the light intensity (the light intensity variation) caused between the red light beam reflected in the near side area of the third dichroic mirror 962 and the red light beam reflected in the far side area thereof should be added to each other, with respect to the red light beam out of the image light beams projected on the screen, the light intensity variation is caused in the lateral direction.

It should be noted that because the same applies to the green light beam and the blue light beam, with respect also to the green light beam and the blue light beam out of the image light beams projected on the screen, the light intensity variation occurs in the lateral direction (the horizontal direction), and as a result, the light intensity variation in the lateral direction (the horizontal direction) should be caused in the image light beams projected on the screen.

As described above, in the projector of the related art, the difference in the light intensity is problematically caused between the light beam reflected or transmitted in the near side area of each of the dichroic mirrors and the light beam reflected or transmitted in the far side area thereof by the factors (1) through (3) described above, and moreover, when the factor (4) described above coincides therewith, the color shading occurs in the lateral direction (the horizontal direction) in the image light beams projected on the screen. It should be noted that because in the projector of the related art, a liquid crystal panel for modulating polarization is used as the light modulation element, the color shading, which is caused in the lateral direction (the horizontal direction) in the image light beams projected on the screen by the polarized light beam from the lighting device not perfectly collimated entering the liquid crystal panel, tends to grow.

As a result of further research based on the above findings repeatedly conducted by the inventors, the inventors perceived that by arranging that the colored light beam reflected or transmitted in the near side area of the first dichroic mirror and the colored light beam reflected or transmitted in the near side area of the third dichroic mirror are projected on the projection surface in a horizontally reversed manner, and that the colored light beam reflected or transmitted in the near side area of the second dichroic mirror and the colored light beam reflected or transmitted in the near side area of the fourth dichroic mirror are projected on the projection surface in a horizontally reversed manner, the color shading in the lateral direction in the image light beams projected on the projection surface can be prevented from occurring, thereby enabling the degradation of the image quality of the projection image to be prevented.

Specifically, a projector according to an aspect of the invention includes a lighting device for emitting light including a first colored light beam, a second colored light beam, and a third colored light beam, a first color separation optical system including a first dichroic mirror, which separates the light from the lighting device into the first colored light beam and the other colored light beams by reflecting the light in a certain wavelength range and transmitting the light in another wavelength range out of the light from the lighting device, and a second dichroic mirror, which separates the other colored light beams into the second colored light beam and the third colored light beam by reflecting the light in a certain wavelength range and transmitting the light in another wavelength range out of the other colored light beams separated by the first dichroic mirror, thereby separating the light from the lighting device into the first through the third colored light beams, first through third light modulation elements respectively modulating the first through the third colored light beams separated by the first color separation optical system, a first color combining optical system for combining the first through the third colored light beams respectively modulated by the first through the third light modulation elements to emit a first image light beam, a second color separation optical system including a third dichroic mirror, which separates the light from the lighting device into the first colored light beam and the other colored light beams by reflecting the light in a certain wavelength range and transmitting the light in another wavelength range out of the light from the lighting device, and a fourth dichroic mirror, which separates the other colored light beams into the second colored light beam and the third colored light beam by reflecting the light in a certain wavelength range and transmitting the light in another wavelength range out of the other colored light beams separated by the third dichroic mirror, thereby separating the light from the lighting device into the first through the third colored light beams, fourth through sixth light modulation elements respectively modulating the first through the third colored light beams separated by the second color separation optical system, a second color combining optical system for combining the first through the third colored light beams respectively modulated by the fourth through the sixth light modulation elements to emit a second image light beam a polarization combining optical system for combining the first image light beam emitted from the first color combining optical system and the second image light beam emitted from the second color combining optical system, and a projection optical system for projecting the image light beam combined by the polarization combining optical system, wherein the projector is configured so that the colored light beam one of reflected and transmitted in a near side area along the lighting beam axis in the first dichroic mirror and the colored light beam one of reflected and transmitted in a near side area along the lighting beam axis in the third dichroic mirror are projected on a projection screen in a laterally reversed manner regarding each of the first through the third colored light beams, and the projector is configured so that the colored light beam one of reflected and transmitted in a near side area along the lighting beam axis in the second dichroic mirror and the colored light beam one of reflected and transmitted in a near side area along the lighting beam axis in the fourth dichroic mirror are projected on the projection screen in a laterally reversed manner regarding each of the first through the third colored light beams.

Therefore, according to the projector of this aspect of the invention, because it is arranged that the light beam reflected or transmitted in the near side area of the first dichroic mirror and the light beam reflected or transmitted in the near side area of the third dichroic mirror are projected on the projection surface in a laterally reversed manner, and in addition, it is also arranged that the light beam reflected or transmitted in the near side area of the second dichroic mirror and the light beam reflected or transmitted in the near side area of the fourth dichroic mirror are projected on the projection surface in a laterally reversed manner, the difference (the light intensity variation) in the light intensity caused between each of the colored light beams reflected in the near side area of each of the dichroic mirrors and each of the colored light beams reflected in the far side area thereof is in a relationship of reversing with each other. As a result, according to the projector of this aspect of the invention, the color shading in the lateral direction of the image light beam projected on the projection surface can be prevented from occurring, thus the degradation of the image quality of the projection image can be prevented.

It should be noted that in the specification, "the lateral direction (horizontal direction) in the projection surface" denotes the direction parallel to the plane on which the optical elements in the projector are disposed out of the directions parallel to the projection surface. In the case of focusing on the first through the fourth dichroic mirrors out of the optical elements in the projectors, this can be rephrased as "the direction parallel to the projection surface and also parallel to a plane which is perpendicular to the each of the mirror surfaces of the first through the fourth dichroic mirrors and includes the lighting beam axis of the lighting device."

Further, "the near side along the lighting beam axis in the first dichroic mirror (the second through the fourth dichroic mirrors)" denotes the area closer to the lighting device in the light beam entrance area of the first dichroic mirror (the second through the fourth dichroic mirrors), and "the far side along the lighting beam axis in the first dichroic mirror (the second through the fourth dichroic mirrors)" denotes the area further than the lighting device in the light beam entrance area of the first dichroic mirror (the second through the fourth dichroic mirrors).

In the projector according to this aspect of the invention, it is preferable that there are further provided a polarization splitting optical system for splitting the light from the lighting device into a light beam having a first polarization component and a light beam having a second polarization component, a first light guiding optical system for guiding the light beam having the first polarization component, which is separated by the polarization separation optical system, to the first color separation optical system, and a second light guiding optical system for guiding the light beam having the second polarization component, which is separated by the polarization separation optical system, to the second color separation optical system.

By thus configuring as described above, the color shading in the lateral direction of the image light beam projected on the projection surface can be prevented from occurring, thus the degradation of the image quality of the projection image can be prevented.

Further, in this aspect of the invention, it is also preferable that the lighting device includes a first lighting device for emitting the light beam having the first polarization component towards the first color separation optical system, and a second lighting device for emitting the light beam having the second polarization component towards the second color separation optical system.

By thus configuring as described above, the color shading in the lateral direction of the image light beam projected on the projection surface can be prevented from occurring, thus the degradation of the image quality of the projection image can be prevented.

In the projector according to this aspect of the invention, it is preferable that a first group including the first color separation optical system, the first through the third light modulation elements, and the first color combining optical system, a second group including the second color separation optical system, the fourth through the sixth light modulation elements, and the second color combining optical system, and the polarization combining optical system are disposed on substantially the same plane.

By thus configuring, a relatively low-profile projector can be realized.

In the projector according to this aspect of the invention, it is preferable that the first color separation optical system is configured so that the first dichroic mirror reflects the first colored light beam and transmits the other colored light beams, and the second dichroic mirror reflects the second colored light beam and transmits the third colored light beam, and the second color separation optical system is configured so that the third dichroic mirror transmits the first colored light beam and reflects the other colored light beams, and the fourth dichroic mirror reflects the second colored light beam and transmits the third colored light beam.

By thus configuring, it becomes relatively easy to realize the low-profile projector described above.

In the projector according to this aspect of the invention, it is preferable that there is further provided a double-sided reflecting mirror disposed between the first dichroic mirror and the first light modulation element and between the fourth dichroic mirror and the sixth light modulation element, and having a surface for reflecting the first colored light beam reflected by the first dichroic mirror and a surface for reflecting the third colored light beam transmitted through the fourth dichroic mirror.

By thus configuring, it becomes relatively easy to realize the low-profile projector described above.

In the projector according to this aspect of the invention, it is preferable that a first group including the first color separation optical system, the first through the third light modulation elements, and the first color combining optical system and a second group including the second color separation optical system, the fourth through the sixth light modulation elements, and the second color combining optical system are respectively disposed on different horizontal planes.

By thus configuring, the optical elements are arranged to form the two-layered structure, thereby obtaining a projector with a relatively small installation area.

In the projector according to this aspect of the invention, it is preferable that there is further provided a reflecting mirror disposed one of between the first color combining optical system and the polarization combining optical system and between the second color combining optical system and the polarization combining optical system, and for reflecting one of the first image light beam emitted from the first color combining optical system and the second image light beam emitted from the second color combining optical system towards the polarization combining optical system.

By thus configuring, it becomes relatively easy to realize the projector (the projector with a two-layered structure) with small installation area described above.

BRIEF DESCRIPTION OF THE DRAWINGS

The invention will now be described with reference to the accompanying drawings, wherein like numbers refer to like elements.

FIGS. 11A and 11B are diagrams provided for explaining a problem of the projector 900 of the related art;

FIG. 12 is a diagram provided for explaining the spectral characteristic of the first dichroic mirror 932.

DETAILED DESCRIPTION OF EMBODIMENTS

Hereinafter, projectors according to the invention will be explained based on embodiments shown in the accompanying drawings.

First Embodiment

Firstly, a configuration of the projector 10 according to a first embodiment will be explained with reference to FIG. 1.

Figure 1:
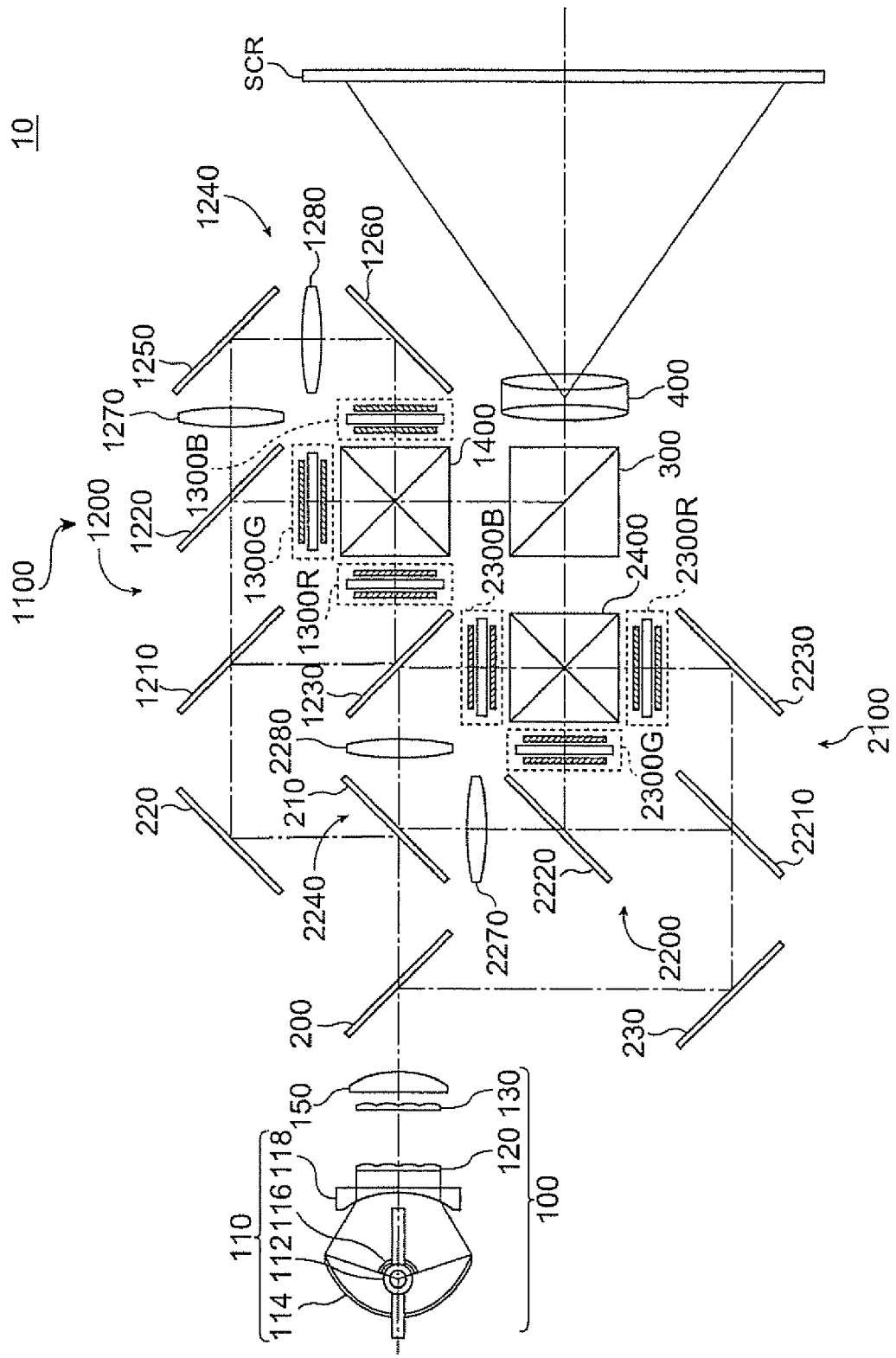
FIG. 1 is a diagram schematically showing an optical system of a projector 10 according to a first embodiment of the invention.

FIG. 1 is a diagram schematically showing an optical system of a projector 10 according to a first embodiment of the invention.

As shown in FIG. 1, the projector 10 according to the first embodiment is provided with a lighting device 100 for emitting a light beam including a red light beam (a first colored light beam), a green light beam (a second colored light beam), and a blue light beam (a third colored light beam), a polarization splitting mirror 200 as a polarization splitting optical system, a double-sided reflecting minor 210 and a reflecting mirror 220 as a first light guiding optical system, a first image forming unit 1100 for emitting a first image light beam, a reflecting mirror 230 as a second light guiding optical system, a second image forming unit 2100 for emitting a second image light beam, a double-sided reflecting mirror 1230, a polarization combining prism 300 as a polarization combining optical system, and a projection optical system 400 for projecting the image light beam combined by the polarization combining prism 300.

The lighting device 100 has a light source device 110 for emitting a lighting beam towards an area to be illuminated, a first lens array 120 having first small lenses for dividing the lighting beam emitted from the light source device 110 into a plurality of partial beams, a second lens array 130 having a plurality of second small lenses corresponding to the plurality of first small lenses of the first lens array 120, and an overlapping lens 150 for overlapping the partial beams emitted from the second lens array 130 with each other in the area to be illuminated.

The light source device 110 has an ellipsoidal reflector 114, a light emitting tube 112 having the emission center in the vicinity of the first focal point of the ellipsoidal reflector 114, a secondary mirror 116 for reflecting light, which is emitted from the light emitting tube 112 towards the area to be illuminated, towards the light emitting tube 112, and a concave lens 118 for substantially collimating the converging light from the ellipsoidal reflector 114 to emit it as a substantially collimated light.

The polarization splitting mirror 200 has a function of splitting the light beam form the lighting device 100 into a light beam (e.g., a p-polarized light beam) having a first polarization component and a light bean (e.g., an s-polarized light beam) having a second polarization component.

The double-sided reflecting mirror 210 and the reflecting mirror 220 as the first light guiding optical system have a function of guiding the light beam, which has the first polarization component and is obtained by the splitting operation of the polarization splitting mirror 200, to the first image forming unit 1100.

The first image forming unit 1100 has a first color separating optical system 1200 for separating the light beam reflected by the reflecting mirror 220 into a red light beam, a green light beam, and a blue light beam, first through third light modulation elements 1300R, 1300G, and 1300B for respectively modulating the colored light beams obtained by the separation operation of the first color separation optical system 1200, and a cross dichroic prism 1400 as a first color combining optical system for combining the red light beam, the green light beam, and the blue light beam respectively modulated by the first through third light modulation elements 1300R, 1300G, and 1300B. A first image light beam having the first polarization component is emitted from the first image forming unit 1100.

The first color separation optical system 1200 has a first dichroic mirror 1210 for separating the light beam reflected by the reflecting mirror 220 into the red light beam and other colored light beams, a second dichroic mirror 1220 for separating the other colored light beams, which are separated from the red light beam by the first dichroic mirror 1210, into the green light beam and the blue light beam, and a relay optical system 1240. The first color separation optical system 1200 has a function of separating the light beam, which is emitted from the lighting device 100 and then reflected by the reflecting mirror 220, into the three colored light beams, namely the red light beam, the green light beam, and the blue light beam, and leading them respectively to the first through third light modulation elements 1300R, 1300G, and 1300B.

The first and second dichroic mirrors 1210, 1220 are optical elements each having a wavelength selection film for reflecting a light beam in a predetermined wavelength range and transmitting light beams in other wavelength ranges formed on a substrate. The first dichroic mirror 1210 is a mirror for reflecting the red light beam out of the light beams reflected by the reflecting mirror 220 and transmitting other colored light beams. The second dichroic mirror 1220 is a mirror for reflecting the green light beam out of the other light beams transmitted through the first dichroic mirror 1210 and transmitting the blue light beam.

The light beam with the red light component reflected by the first dichroic mirror 1210 is deflected by the double-sided reflecting mirror 1230 described later, and enters the image forming area of a liquid crystal panel of the first light modulation element 1300R. The light beam with the green light component out of the light beams with the green and blue light components transmitted through the first dichroic mirror 1210 is reflected by the second dichroic mirror 1220, and enters the image forming area of a liquid crystal panel of the second light modulation element 1300G. On the other hand, the light beam with the blue light component is transmitted through the second dichroic mirror 1220, and enters the relay optical system 1240.

The relay optical system 1240 includes an entrance side lens 1270, an entrance side reflecting mirror 1250, a relay lens 1280, and an emission side reflecting mirror 1260, and has a function of guiding the light beam with the blue light component transmitted through the second dichroic mirror 1220 to the liquid crystal panel of the third light modulation element 1300B. The light beam with the blue light component entering the relay optical system 1240 is transmitted through the entrance side lens 1270, deflected by the reflecting mirror 1250, relayed by the relay lens 1280, then deflected by the reflecting mirror 1260, and enters the image forming area of a liquid crystal panel of the third light modulating element 1300B.

The first through third light modulation elements 1300R, 1300G, and 1300B are for modulating the respective lighting beams in accordance with the image information, and form an object to be illuminated by the lighting device 100. The first through third light modulation elements 1300R, 1300G, and 1300B each have the liquid crystal panel, an entrance side polarization plate disposed on the light beam entrance side of the liquid crystal panel, and an emission side polarization plate disposed on the light beam emission side of the liquid crystal panel.

The liquid crystal panel is formed encapsulating a liquid crystal material as an electro-optic material between a pair of transparent glass plates, and modulates the polarization direction of one kind of linearly polarized light beam emitted from the entrance side polarization plate in accordance with image information provided thereto using, for example, polysilicon TFT as switching elements.

The entrance side polarization plate, the liquid crystal panel, and the emission side polarization plate perform the light modulation of each of the colored light beams input therein.

The cross dichroic prism 1400 is an optical element for combining optical images modulated for respective colored light beams emitted from the respective emission side polarization plates to form a color image. The cross dichroic prism 1400 has a substantially rectangular planar shape formed of four rectangular prisms bonded with each other, and on the substantially X-shaped interfaces on which the rectangular prisms are bonded with each other, there are formed dielectric multilayer films. The dielectric multilayer film formed on one of the substantially X-shaped interfaces is for reflecting the red light beam, and the dielectric multilayer film formed on the other of the interfaces is for reflecting the blue light beam. The red light beam and the blue light beam are deflected by these dielectric multilayer films to have the proceeding direction aligned with the proceeding direction of the green light, thus the three colored light beams are combined.

The reflecting mirror 230 as the second light guiding optical system has a function of guiding the light beam, which has the second polarization component and is obtained by the splitting operation of the polarization splitting mirror 200, to the second image forming unit 2100.

The second image forming unit 2100 has a second color separating optical system 2200 for separating the light beam reflected by the reflecting mirror 230 into a red light beam, a green light beam, and a blue light beam, fourth through sixth light modulation elements 2300R, 2300G, and 2300B for respectively modulating the colored light beams obtained by the separation operation of the second color separation optical system 2200, and a cross dichroic prism 2400 as a second color combining optical system for combining the red light beam, the green light beam, and the blue light beam respectively modulated by the fourth through sixth light modulation elements 2300R, 2300G, and 2300B. A second image light beam having the second polarization component is emitted from the second image forming unit 2100.

The second color separation optical system 2200 has a third dichroic mirror 2210 for separating the light beam reflected by the reflecting mirror 230 into the red light beam and other colored light beams, a fourth dichroic mirror 2220 for separating the other colored light beams, which are separated from the red light beam by the third dichroic mirror 2210, into the green light beam and the blue light beam, and a relay optical system 2240. The second color separation optical system 2200 has a function of separating the light beam, which is emitted from the lighting device 100 and then reflected by the reflecting mirror 230, into the three colored light beams, namely the red light beam, the green light beam, and the blue light beam, and leading them respectively to the fourth through sixth light modulation elements 2300R, 2300G and 2300B, The third and fourth dichroic mirrors 2210, 2220 are optical elements each having a wavelength selection film for reflecting a light beam in a predetermined wavelength range and transmitting light beams in other wavelength ranges formed on a substrate. The third dichroic mirror 2210 is a mirror for transmitting the red light beam out of the light beams reflected by the reflecting mirror 230 and reflecting other colored light beams. The fourth dichroic mirror 2220 is a mirror for reflecting the green light beam out of the other light beams reflected by the third dichroic mirror 2210 and transmitting the blue light beam.

The light beam with the red light component transmitted through the third dichroic mirror 2210 is deflected by the reflecting mirror 2230, and enters the image forming area of a liquid crystal panel of the fourth light modulation element 2300R. The light beam with the green light component out of the light beams with the green and blue light components reflected by the third dichroic mirror 2210 is reflected by the fourth dichroic mirror 2220, and enters the image forming area of a liquid crystal panel of the fifth light modulation element 2300G. On the other hand, the light beam with the blue light component is transmitted through the fourth dichroic mirror 2220, and enters the relay optical system 2240.

The relay optical system 2240 includes an entrance side lens 2270, a relay lens 2280, and an emission side reflecting mirror 2260, and has a function of guiding the light beam with the blue light component transmitted through the fourth dichroic mirror 2220 to the liquid crystal panel of the sixth light modulation element 2300B. The light beam with the blue light component entering the relay optical system 2240 is transmitted through the entrance side lens 2270, deflected by the double-sided reflecting mirror 210, relayed by the relay lens 2280, then deflected by the double-sided reflecting mirror 1230 described later, and enters the image forming area of a liquid crystal panel of the sixth light modulating element 2300B. It should be noted that in the projector 10 according to the first embodiment, the double-sided reflecting mirror 210 and the double-sided reflecting mirror 1230 of the first light guiding optical system are used also as the reflecting mirrors of the relay optical system 2240.

Because the fourth through sixth light modulation elements 2300R, 2300G, and 2300B and the cross dichroic prism 2400 have substantially the same configurations as the first through third light modulation elements 1300R, 1300G, and 1300B and the cross dichroic prism 1400, detailed explanations therefor will be omitted.

The double-sided reflecting mirror 1230 is a double-sided reflecting mirror disposed between the first dichroic mirror 1210 and the first light modulation element 1300R, and also between the fourth dichroic mirror 2220 (the double-sided reflecting mirror 210) and the sixth light modulation element 2300B, and having a surface for reflecting the red light beam reflected by the first dichroic mirror 1210 and a surface for reflecting the blue light beam transmitted through the fourth dichroic mirror 2220.

The polarization combining prism 300 has a polarization combining surface for combining the light beam with the first polarization component and the light beam with the second polarization component with each other, and combines a first image light beam emitted from the first image forming unit 1100 and a second image light beam emitted from the second image forming unit 2100 with each other to emit it to the projection optical system 400.

The color image emitted from the polarization combining prism 300 is enlargedly projected by the projection optical system 400 to form a large screen image on the screen SCR.

The first image forming unit 1100 (the first color separation optical system 1200, the first through third light modulation elements 1300R, 1300G, and 1300B, and the cross dichroic prism 1400), the second image forming unit 2100 (the second color separation optical system 2200, the fourth through sixth light modulation elements 2300R, 2300G, and 2300B, and the dichroic prism 2400), and the polarization combining prism 300 are arranged on substantially the same plane. In other words, the cross dichroic prism 1400 in the first image forming unit 1100, the cross dichroic prism 2400 in the second image forming unit 2100, and the polarization combining prism 300 are arranged so that the center axes of the light beams emitted respectively from these optical elements are arranged in substantially the same plane.

The projector 10 according to the first embodiment has the configuration and arrangement of the optical elements as described above. Thus, it is arranged that the light beam reflected or transmitted in the near side area of the first dichroic mirror 1210 and the light beam reflected or transmitted in the near side area of the third dichroic mirror 2210 are projected on the screen SCR in a laterally reversed manner, and it is also arranged that the light beam reflected or transmitted in the near side area of the second dichroic mirror 1220 and the light beam reflected or transmitted in the near side area of the fourth dichroic mirror 2220 are projected on the screen SCR in a laterally reversed manner. Hereinafter, detailed explanations will be presented with reference to FIG. 2.

Figure 2:
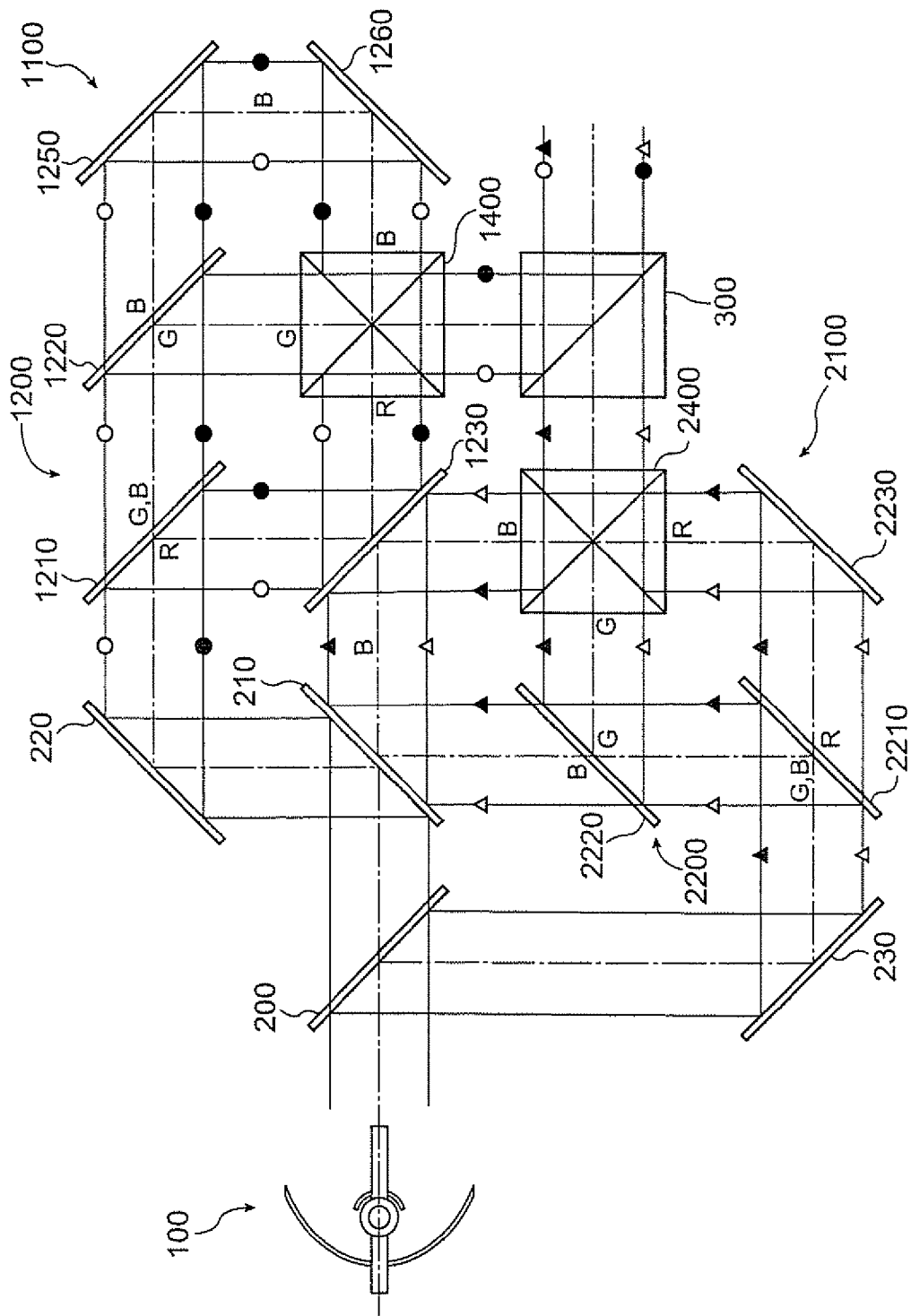
FIG. 2 is a diagram schematically showing light paths of light beams passing through the projector 10 according to the first embodiment.

FIG. 2 is a diagram schematically showing light paths of light beams passing through the projector 10 according to the first embodiment. In FIG. 2, a light path of a light beam entering a near side area along the system optical axis of the first dichroic mirror 1210 is denoted with open circles "○," a light path of a light beam entering a far side area along the system optical axis of the first dichroic mirror 1210 is denoted with filled circles "●," a light path of a light beam entering a near side area along the system optical axis of the third dichroic mirror 2210 is denoted with open triangles "△," a light path of a light beam entering a far side area along the system optical axis of the third dichroic mirror 2210 is denoted with filled circles "▲." It should be noted that in FIG. 2, some optical elements in the lighting device 100, the entrance side lenses 1270, 2270 and the relay lenses 1280, 2280 in the relay optical systems 1240, 2240, the first through sixth light modulation elements 1300R, 1300G, 1300B, 2300R, 2300G, and 2300B, and projection optical system 400 shown in FIG. 1 are omitted from illustration for the sake of simplification of the drawing.

In the projector 10 according to the first embodiment, as shown in FIG. 2, the red light beam (see the light path of "○") reflected in the near side area of the first dichroic mirror 1210 is overlapped with the red light beam (see the light path of "▲") transmitted in the far side area of the third dichroic mirror 2210, and the red light beam (see the light path of "●") reflected in the far side area of the first dichroic mirror 1210 is overlapped with the red light beam (see the light path of "Δ") transmitted in the near side area of the third dichroic mirror 2210.

Therefore, even in the case in which the differences in the light intensity between the light beams reflected or transmitted in the near side areas of the respective dichroic mirrors 1210, 1920, 2210, and 2220 are caused by the factors (1) through (3) described above, the difference (the light intensity variation) in the light intensity caused between the red light beam reflected in the near side area of the first dichroic mirror 1210 and the red light beam reflected in the far side area thereof and the difference (the light intensity variation) in the light intensity caused between the red light beam transmitted in the near side area of the third dichroic mirror 2210 and the red light beam transmitted in the far side area thereof are in a relationship of reversing with each other.

As a result, with respect to the red light beam out of the image light beams projected on the screen SCR, the light intensity variation in the lateral direction (the horizontal direction) can be prevented from occurring.

Regarding the green light beam, similarly to the above, the green light beam (see the light path of "○") reflected in the near side area of the second dichroic mirror 1220 is overlapped with the green light beam (see the light path of "▲") reflected in the far side area of the fourth dichroic mirror 2220, and the green light beam (see the light path of "●") reflected in the far side area of the second dichroic mirror 1220 is overlapped with the green light beam (see the light path of "Δ") reflected in the near side area of the fourth dichroic mirror 2220.

Therefore, the difference (the light intensity variation) in the light intensity caused between the green light beam reflected in the near side area of the second dichroic mirror 1220 and the green light beam reflected in the far side area thereof and the difference (the light intensity variation) in the light intensity caused between the green light beam reflected in the near side area of the fourth dichroic mirror 2220 and the green light beam reflected in the far side area thereof are reversed with each other. As a result, with respect to the green light beam out of the image light beams projected on the screen SCR, the light intensity variation in the lateral direction (the horizontal direction) can be prevented from occurring.

Regarding the blue light beam, similarly to the above, the blue light beam (see the light path of "○") transmitted in the near side area of the second dichroic mirror 1220 is overlapped with the blue light beam (see the light path of "▲") transmitted in the far side area of the fourth dichroic mirror 2220, and the blue light beam (see the light path of "●") transmitted in the far side area of the second dichroic mirror 1220 is overlapped with the blue light beam (see the light path of "Δ") transmitted in the near side area of the fourth dichroic mirror 2220.

Therefore, the difference (the light intensity variation) in the light intensity caused between the blue light beam transmitted in the near side area of the second dichroic mirror 1220 and the blue light beam transmitted in the far side area thereof and the difference (the light intensity variation) in the light intensity caused between the blue light beam transmitted in the near side area of the fourth dichroic mirror 2220 and the blue light beam transmitted in the far side area thereof are reversed with each other. As a result, with respect to the blue light beam out of the image light beams projected on the screen SCR, the light intensity variation in the lateral direction (the horizontal direction) can be prevented from occurring.

Therefore, according to the projector 10 relating to the first embodiment, the color shading in the lateral direction of the image light beams projected on the screen SCR can be prevented from occurring, thus the degradation of the image quality of the projection image can be prevented.

Because in the projector 10 according to the first embodiment, the first image forming unit 1100 (the first color separation optical system 1200, the first through third light modulation elements 1300R, 1300G, and 1300B, and the cross dichroic prism 1400), the second image forming unit 2100 (the second color separation optical system 2200, the fourth through sixth light modulation elements 2300R, 2300G, and 2300B, and the dichroic prism 2400), and the polarization combining prism 300 are arranged on substantially the same plane, it becomes possible to realize a relatively low-profile projector.

Because in the projector 10 according to the first embodiment, the first color separation optical system 1200 is configured so that the first dichroic mirror 1210 reflects the red light beam and transmits other colored light beams, and the second dichroic mirror 1220 reflects the green light beam and transmits the blue light beam, and the second color separation optical system 2200 is configured so that the third dichroic mirror 2210 transmits the red light beam and reflects other colored light beams, and the fourth dichroic mirror 2220 reflects the green light beam and transmits the blue light beam, it becomes relatively easy to realize the low-profile projector described above.

Because in the projector 10 according to the first embodiment, the double-sided reflecting mirror 1230 described above is further provided, it becomes relatively easy to realize the low-profile projector described above.

Second Embodiment

Figure 3:
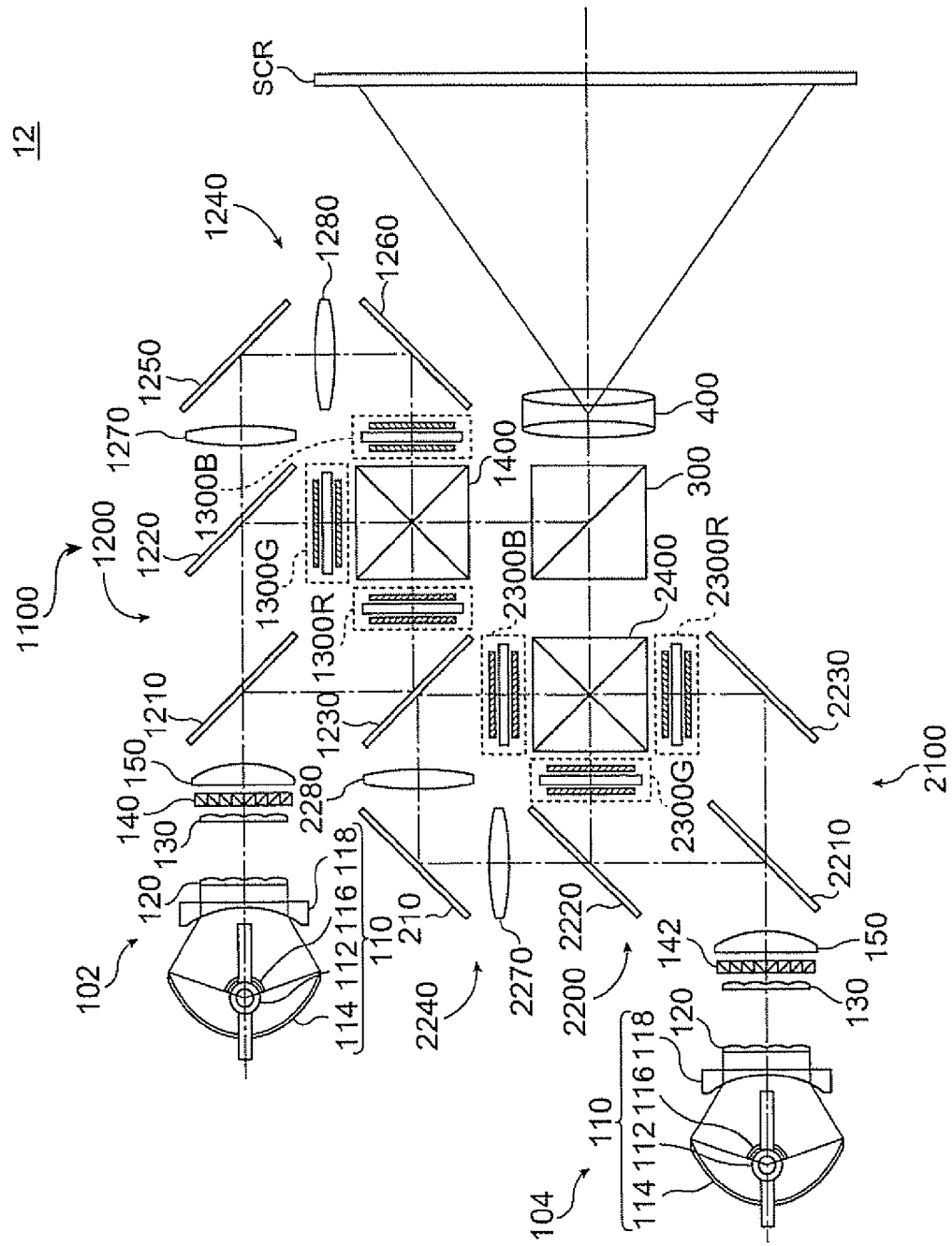
FIG. 3 is a diagram schematically showing an optical system of a projector 12 according to a second embodiment of the invention.
Figure 4:
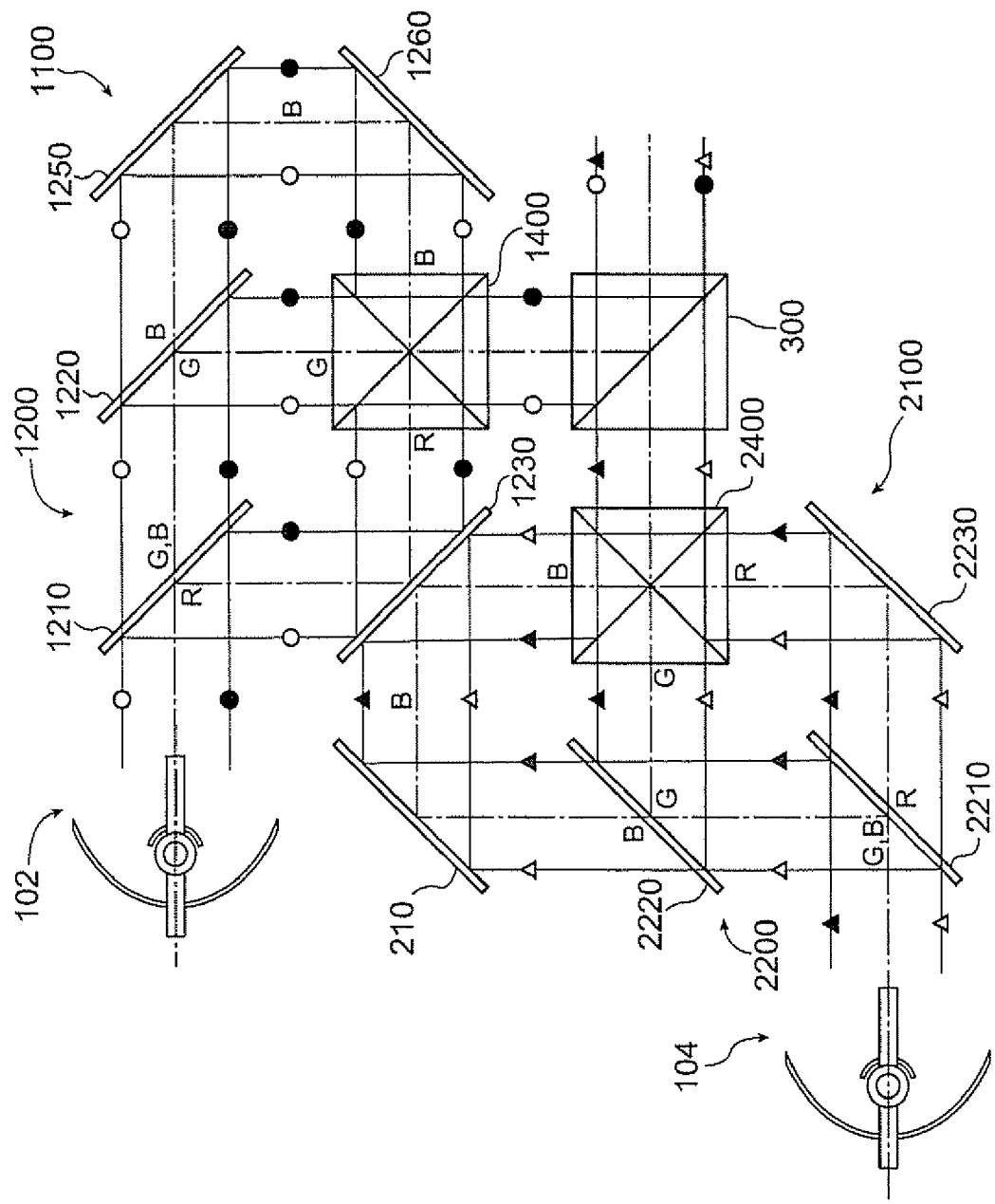
FIG. 4 is a diagram schematically showing light paths of light beams passing through the projector 12 according to the second embodiment.

FIG. 3 is a diagram schematically showing an optical system of a projector 12 according to a second embodiment of the invention. FIG. 4 is a diagram schematically showing light paths of light beams passing through the projector 12 according to the second embodiment. It should be noted that in FIGS. 3 and 4, the same members as shown in FIGS. 1 and 2 are denoted with the same reference numerals and detailed explanations therefor will be omitted.

Although the projector 12 according to the second embodiment basically has a similar configuration to the projector 10 according to the first embodiment, the projector 12 is different from the case with the projector 10 according to the first embodiment in that two lighting devices are provided, and that the polarization splitting optical system and the first and second light guiding optical systems are eliminated.

In other words, as shown in FIG. 3, the projector 12 according to the second embodiment is provided with a first lighting device 102 for emitting a light beam (e.g., a p-polarized light beam) having a first polarization component towards the first image forming unit 1100 and a second lighting device 104 for emitting a light beam (e.g., an s-polarized light beam) having a second polarization component towards the second image forming unit 2100 as the lighting device.

The first lighting device 102 and the second lighting device 104 each have a similar configuration to the lighting device 100 described in the first embodiment, but are different from the lighting device 100 described in the first embodiment in that a polarization conversion element is further provided.

Specifically, the first lighting device 102 has a light source device 110 for emitting a lighting beam towards an area to be illuminated, a first lens array 120 having a plurality of first small lenses 122 for dividing the lighting beam emitted from the light source device 110 into a plurality of partial beams, a second lens array 130 having a plurality of second small lenses 132 corresponding to the plurality of first small lenses 122 of the first lens array 120, a polarization conversion element 140 for polarization-converting each of the partial beams from the second lens array 130 into a light beam having the first polarization component and emitting the resulted light beams, and an overlapping lens 150 for overlapping the partial beams emitted from the polarization conversion element 140 with each other in the area to be illuminated. Thus, the first lighting device 102 emits the light beam having the first polarization component.

The second lighting device 104 has the light source device 110 for emitting a lighting beam towards the area to be illuminated, the first lens array 120 having the plurality of first small lenses 122 for dividing the lighting beam emitted from the light source device 110 into a plurality of partial beams, the second lens array 130 having the plurality of second small lenses 132 corresponding to the plurality of first small lenses 122 of the first lens array 120, a polarization conversion element 142 for polarization-converting each of the partial beams from the second lens array 130 into a light beam having the second polarization component and emitting the resulted light beams, and the overlapping lens 150 for overlapping the partial beams emitted from the polarization conversion element 142 with each other in the area to be illuminated. Thus, the second lighting device 104 emits the light beam having the second polarization component.

Also in the projector 12 according to the second embodiment thus configured as described above, similarly to the case with the projector 10 according to the first embodiment, it is arranged that the light beam reflected or transmitted in the near side area of the first dichroic mirror 1210 and the light beam reflected or transmitted in the near side area of the third dichroic mirror 2210 are projected on the screen SCR in a laterally reversed manner, and it is also arranged that the light beam reflected or transmitted in the near side area of the second dichroic mirror 1220 and the light beam reflected or transmitted in the near side area of the fourth dichroic mirror 2220 are projected on the screen SCR in a laterally reversed manner.

In a specific explanation, as shown in FIG. 4, the red light beam (see the light path of "○") reflected in the near side area of the first dichroic mirror 1210 is overlapped with the red light beam (see the light path of "▲") transmitted in the far side area of the third dichroic mirror 2210, and the red light beam (see the light path of "●") reflected in the far side area of the first dichroic mirror 1210 is overlapped with the red light beam (see the light path of "△") transmitted in the near side area of the third dichroic mirror 2210.

Therefore, even in the case in which the differences in the light intensity between the light beams reflected or transmitted in the near side areas of the respective dichroic mirrors 1210, 1220, 2210, and 2220 are caused by the factors (1) through (3) described above, the difference (the light intensity variation) in the light intensity caused between the red light beam reflected in the near side area of the first dichroic mirror 1210 and the red light beam reflected in the far side area thereof and the difference (the light intensity variation) in the light intensity caused between the red light beam transmitted in the near side area of the third dichroic mirror 2210 and the red light beam transmitted in the far side area thereof are in a relationship of reversing with each other.

As a result, with respect to the red light beam out of the image light beams projected on the screen SCR, the light intensity variation in the lateral direction (the horizontal direction) can be prevented from occurring.

It should be noted that although the explanations are omitted, the same applies to the green light beam and the blue light beam.

Therefore, according also to the projector 12 relating to the first embodiment, similarly to the case with the projector 10 according to the first embodiment, the color shading in the lateral direction of the image light beams projected on the screen SCR can be prevented from occurring, thus the degradation of the image quality of the projection image can be prevented.

Third Embodiment

Figure 5:
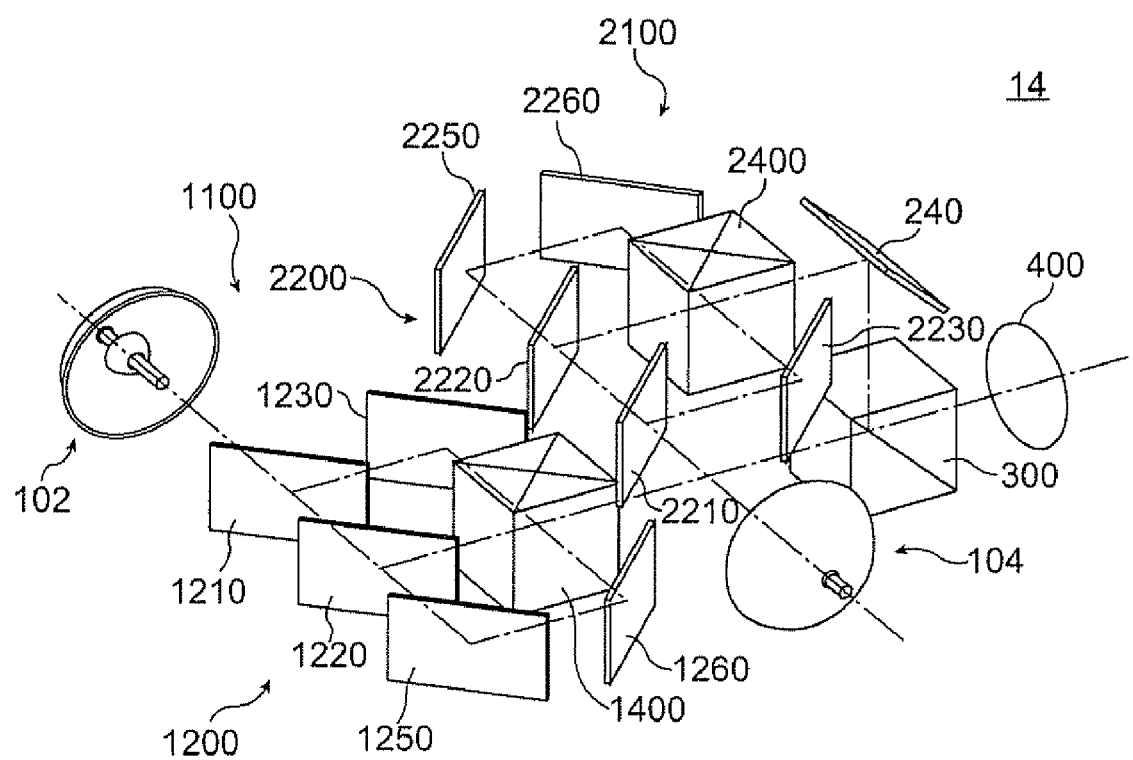
FIG. 5 is a diagram schematically showing an optical system of a projector 14 according to a third embodiment of the invention.
Figure 6:
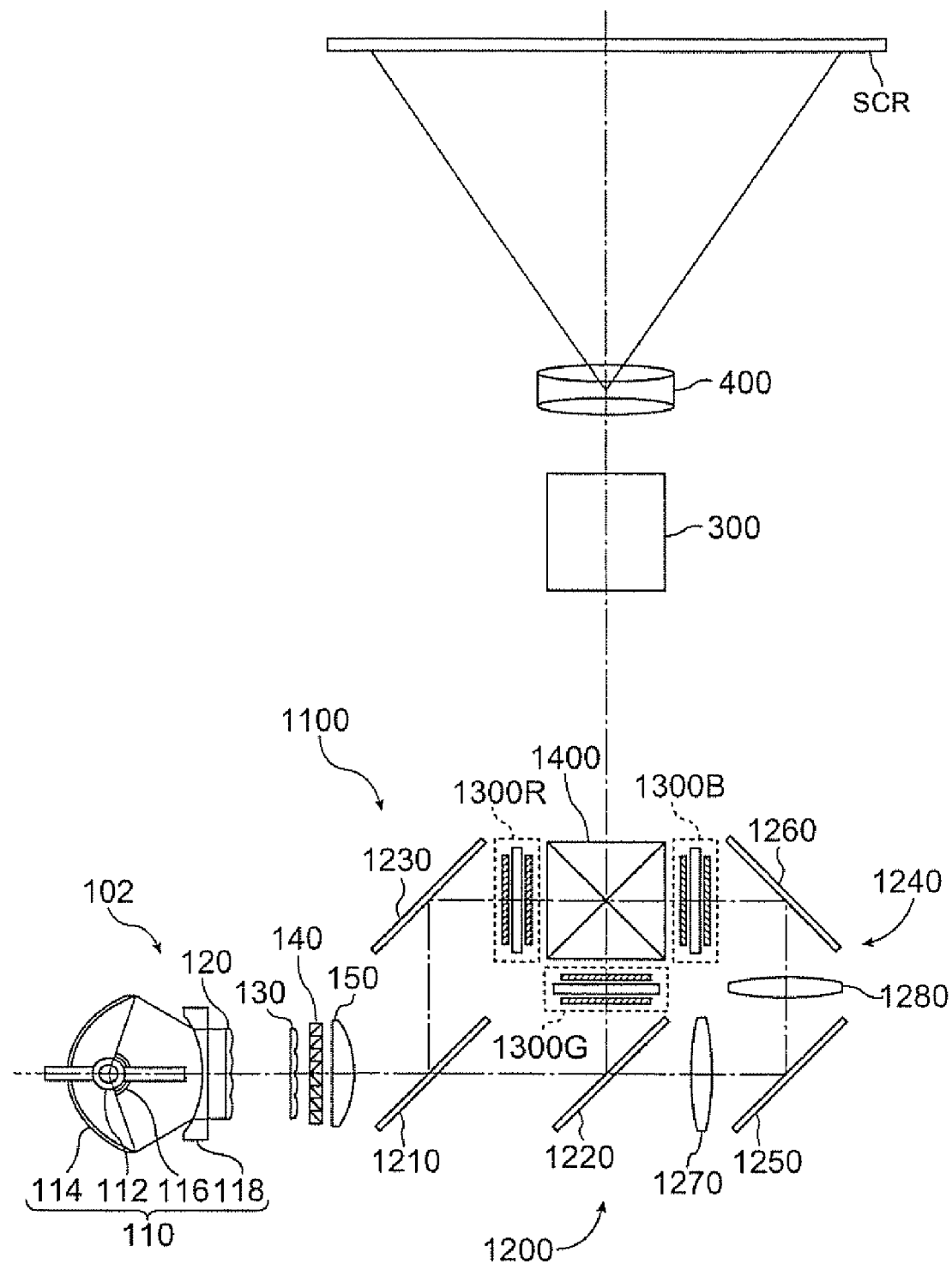
FIG. 6 is a diagram schematically showing an optical system of a projector 14 according to the third embodiment of the invention.
Figure 7:
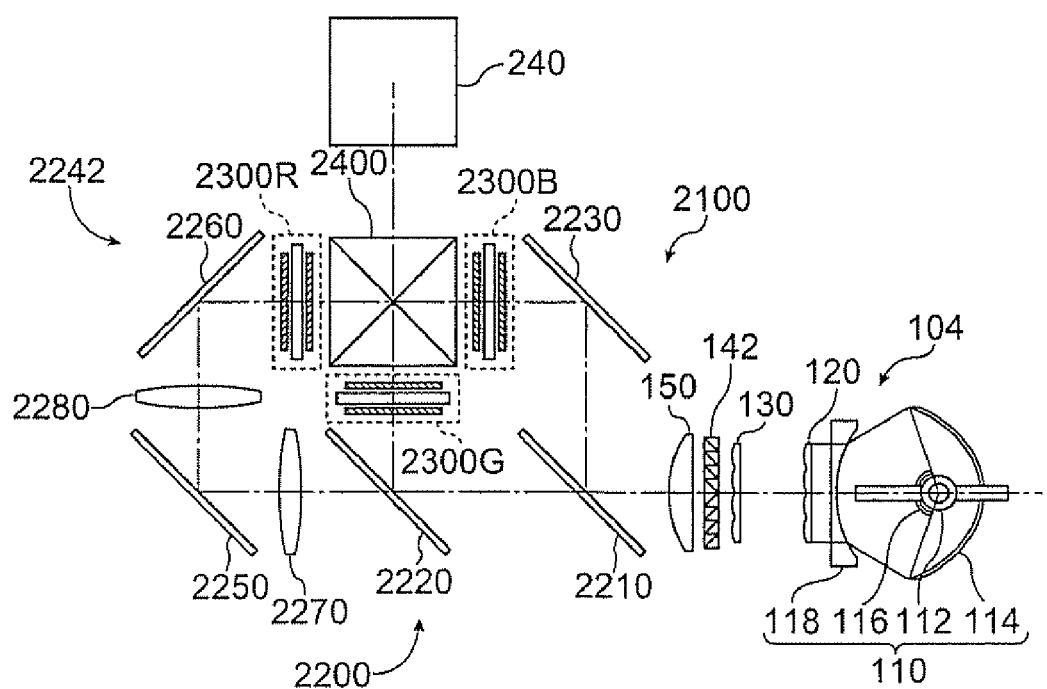
FIG. 7 is a diagram schematically showing an optical system of a projector 14 according to the third embodiment of the invention.
Figure 8:
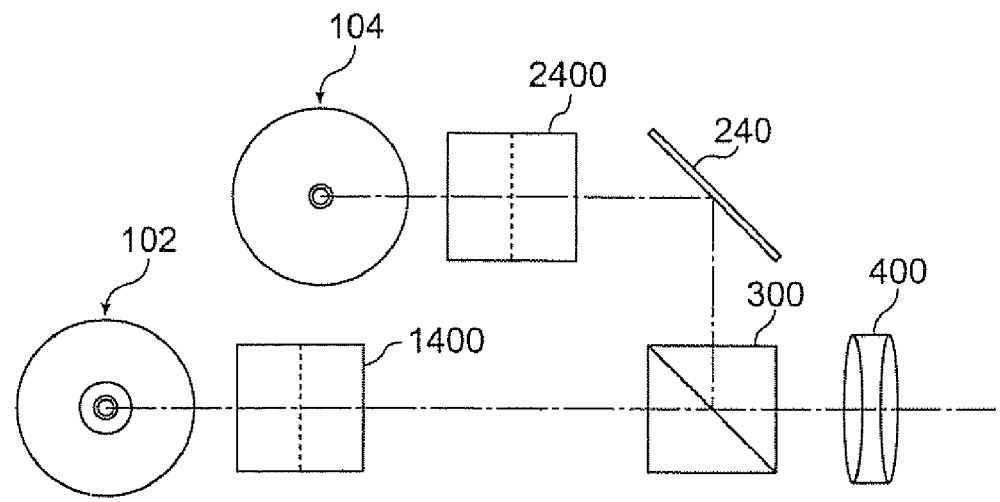
FIG. 8 is a diagram schematically showing an optical system of a projector 14 according to the third embodiment of the invention.

FIGS. 5 through 8 are diagrams schematically showing an optical system of a projector 14 according to a third embodiment of the invention. FIG. 5 is a perspective view of the projector 14, FIG. 6 is a top view of optical elements of the projector 14 disposed in a lower layer, FIG. 7 is a top view of optical elements of the projector 14 disposed in an upper layer, and FIG. 8 is a side view of the projector 14. It should be noted that in FIG. 5, some optical elements in the first and second lighting devices 102, 104, the entrance side lenses 1270, 2270 and the relay lenses 1280, 2280 in the relay optical systems 1240, 2242, and the first through sixth light modulation elements 1300R, 1300G, 1300B, 2300R, 2300G, and 2300B are omitted from illustration for the sake of simplification of the drawing. Further, in FIG. 8, the reflecting mirrors and so on in each of the image forming units 1100, 2100 are omitted from illustration for the sake of easier understanding of the invention.

Figure 9A:
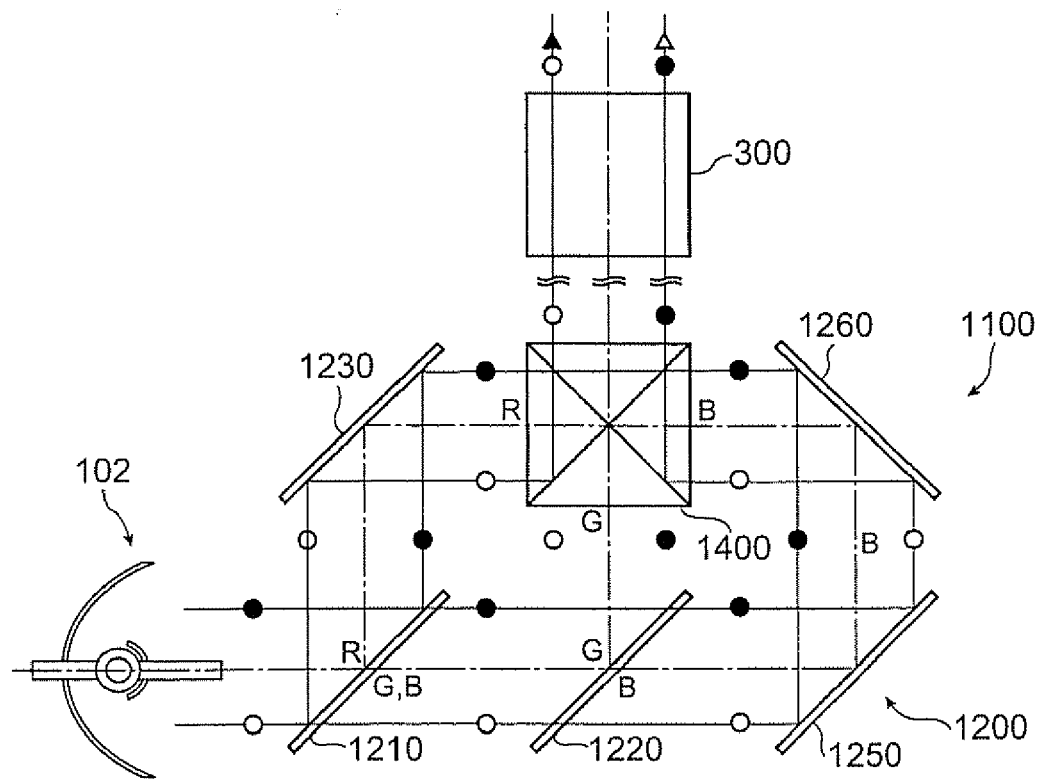
FIGS. 9A and 9B are diagrams schematically showing light paths of light beams passing through the projector 14 according to the third embodiment.
Figure 9B:
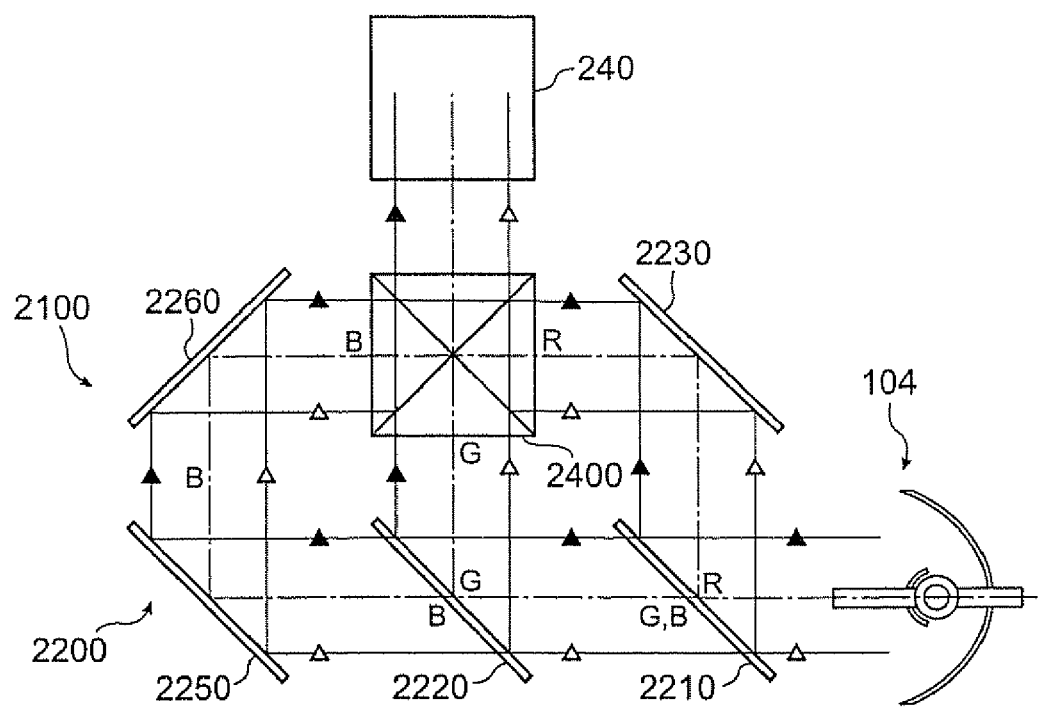
Figure 10:
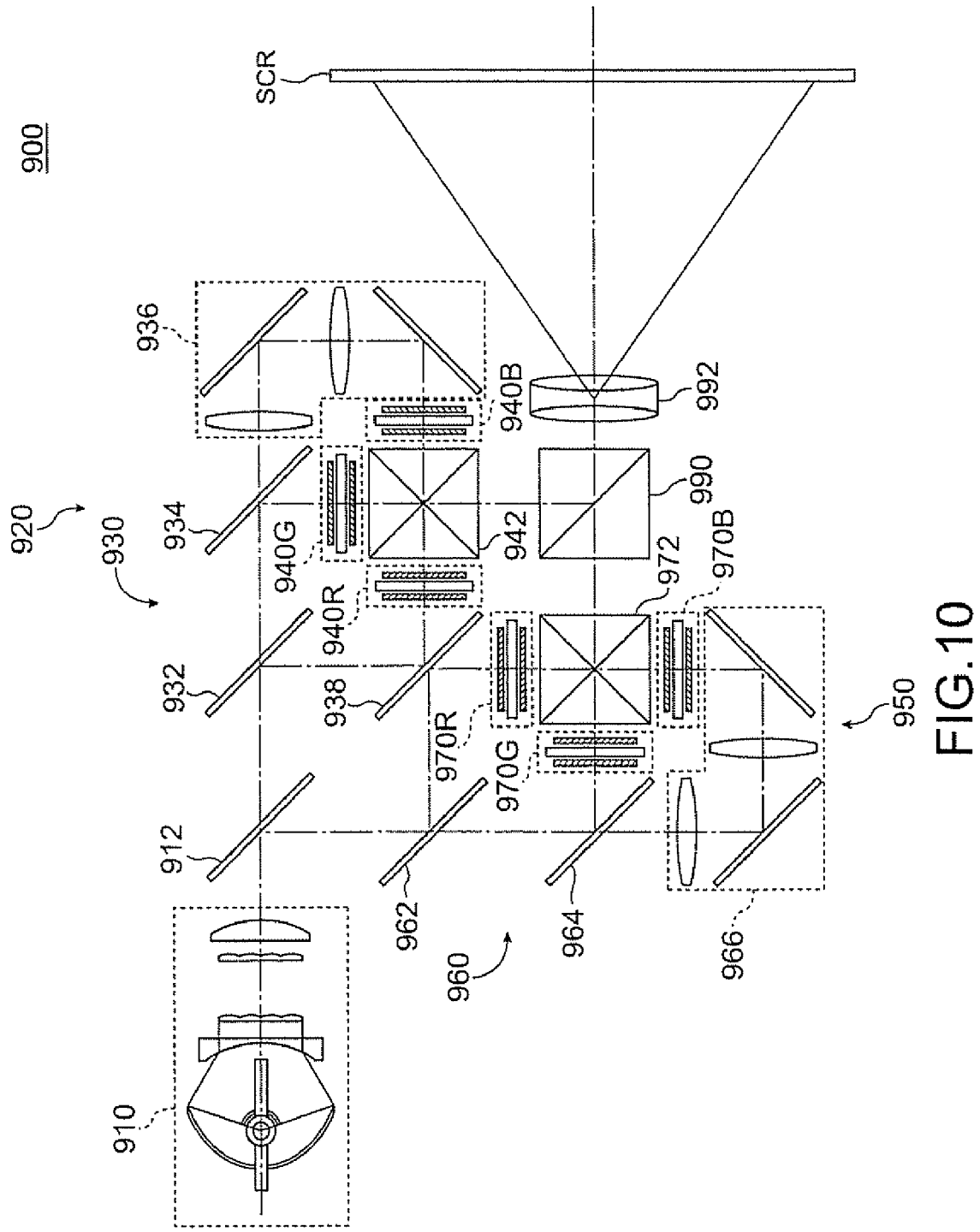
FIG. 10 is a diagram schematically showing an optical system of a projector 900 of the related art.
Figure 13:
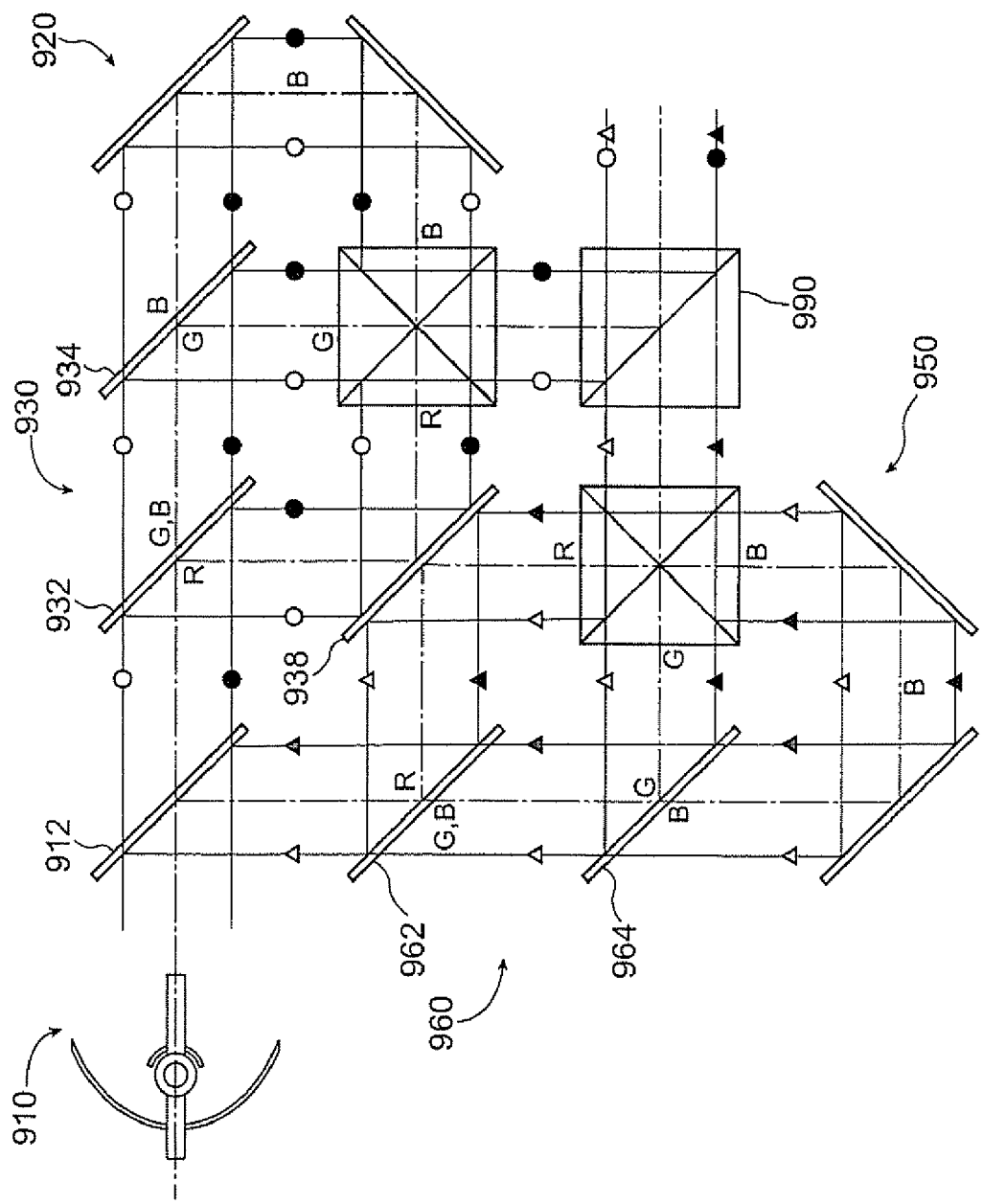
FIG. 13 is a diagram schematically showing light paths of the light beams passing through the projector 900 of the related art.

FIGS. 9A and 9B are diagrams schematically showing light paths of light beams passing through the projector 14 according to the third embodiment. FIG. 9A is a diagram schematically showing the light paths of the light beams passing through the optical elements of the projector 14 disposed in the lower layer, and FIG. 9B is a diagram schematically showing the light paths of the light beams passing through the optical elements of the projector 14 disposed in the upper layer.

It should be noted that in FIGS. 5 through 8, 9A, and 9B, the same members as shown in FIGS. 1 through 4 are denoted with the same reference numerals and detailed explanations therefor will be omitted.

Although the projector 14 according to the third embodiment basically has a similar configuration to the projector 12 according to the second embodiment, the projector 14 is different from the case with the projector 12 according to the second embodiment in that the optical elements disposed inside the projector are arranged in a two-layered structure.

Specifically, in the projector 14 according to the third embodiment, as shown in FIGS. 5 through 8, the first image forming unit 1100 (the first color separation optical system 1900, the first through third light modulation elements 1300R, 1300G, and 1300B, and the cross dichroic prism 1400) for emitting the first image light beam and the second image forming unit 2100 (the second color separation optical system 2200, the fourth through sixth light modulation elements 2300R, 2300G, and 2300B, and the cross dichroic prism 2400) for emitting the first image light beam are not arranged on the same plane, but are formed to have a so-called two-layered stricture in which the optical elements forming the first image forming unit 1100 are disposed in the lower layer and the optical elements forming the second image forming unit 2100 are disposed in the upper layer. On the light emission side of the second image forming unit 2100, there is disposed a reflecting mirror 240 for reflecting the second image light beam, which has the second polarization component and is emitted from the second image forming unit 2100, downward (to the polarization combining prism 300). The polarization combining prism 300 is disposed in the lower layer similarly to the first image forming unit 1100, combines the first image light beam having the first polarization component and emitted from the first image forming unit 1100 and the second image light beam having the second polarization component and reflected by the reflecting mirror 240, and emits the resulted light beam to the projection optical system 400.

Also in the projector 14 according to the third embodiment thus configured as described above, similarly to the case with the projector 12 according to the second embodiment, it is arranged that the light beam reflected or transmitted in the near side area of the first dichroic mirror 1210 and the light beam reflected or transmitted in the near side area of the third dichroic mirror 2210 are projected on the screen SCR in a laterally reversed manner, and it is also arranged that the light beam reflected or transmitted in the near side area of the second dichroic mirror 1220 and the light beam reflected or transmitted in the near side area of the fourth dichroic mirror 2220 are projected on the screen SCR in a laterally reversed manner.

In a specific explanation, as shown in FIGS. 9A and 9B, the red light beam (see the light path of "○") reflected in the near side area of the first dichroic mirror 1210 is overlapped with the red light beam (see the light path of "▲") transmitted in the far side area of the third dichroic mirror 2210, and the red light beam (see the light path of "●") reflected in the far side area of the first dichroic mirror 1210 is overlapped with the red light beam (see the light path of "Δ") transmitted in the near side area of the third dichroic mirror 2210.

Therefore, even in the case in which the differences in the light intensity between the light beams reflected or transmitted in the near side areas of the respective dichroic mirrors 1210, 1220, 2210, and 2220 are caused by the factors (1) through (3) described above, the difference (the light intensity variation) in the light intensity caused between the red light beam reflected in the near side area of the first dichroic mirror 1210 and the red light beam reflected in the far side area thereof and the difference (the light intensity variation) in the light intensity caused between the red light beam transmitted in the near side area of the third dichroic mirror 2210 and the red light beam transmitted in the far side area thereof are in a relationship of reversing with each other.

As a result, with respect to the red light beam out of the image light beams projected on the screen SCR, the light intensity variation in the lateral direction (the horizontal direction) can be prevented from occurring.

It should be noted that although the explanations are omitted, the same applies to the green light beam and the blue light beam.

Therefore, according also to the projector 14 relating to the third embodiment, similarly to the case with the projectors 10, 12 according to the first and second embodiments, the color shading in the lateral direction of the image light beams projected on the screen SCR can be prevented from occurring, thus the degradation of the image quality of the projection image can be prevented.

In the projector 14 according to the third embodiment, the first image forming unit 1100 (the first color separation optical system 1200, the first through third light modulation elements 1300R, 1300G, and 1300B, and the cross dichroic prism 1400) and the second image forming unit 2100 (the second color separation optical system 2200, the fourth through sixth light modulation elements 2300R, 2300G, and 2300B, and the dichroic prism 2400) are respectively arranged on different horizontal planes. In other words, the first lighting device 102, the cross dichroic prism 1400 in the first image forming unit 1100, the second lighting device 104, the cross dichroic prism 2400 in the second image forming unit 2100 are arranged so that a virtual plane including both of the lighting beam axis of the first lighting device 102 and the center axis of the light beam emitted from the cross dichroic prism 1400 in the first image forming unit 1100 and a virtual plane including both of the lighting beam axis of the second lighting device 104 and the center axis of the light beam emitted from the cross dichroic prism 2400 in the second image forming unit 2100 are positioned differently. Thus, the optical elements are arranged to form the two-layered structure, thereby obtaining a projector with a relatively small installation area.

Because in the projector 14 according to the third embodiment, the reflecting mirror 240 described above is further provided, it becomes relatively easy to realize the projector with a small installation area described above.

Hereinabove, although the projectors according to the embodiments of the invention are explained, the invention is not limited to the embodiments described above, but can be put into practice in various forms within the scope or the spirit of the invention, and the following modifications, for example, are also possible.

Although in each of the embodiments, the polarization splitting mirror is used as the polarization splitting optical system, the invention is not limited to the polarization splitting mirror, but a polarization splitting prism (a polarizing beam splitter) can also be used. Further, although in each of the embodiments described above, the polarization combining prism is used as the polarization combining optical system, the invention is not limited to the polarization combining prism, but a polarization combining element having a polarization combining surface formed on a substrate can also be used.

Although in the third embodiment, the explanations are presented exemplifying the configuration in which the first image forming unit 1100 and the polarization combining prism 300 are disposed in the lower layer, the second image forming unit 2100 is disposed in the upper layer, and the light beam from the second image forming unit 2100 is reflected downward by the reflecting mirror 240 disposed on the emission side of the second image forming unit 2100, the invention is not limited to this configuration, and it is also possible to adopt a configuration in which the first image forming unit 1100 is disposed in the lower layer, the second image forming unit 2100 and the polarization combining prism 300 are disposed in the upper layer, and the light beam from the first image forming unit 1100 is reflected upward by the reflecting mirror disposed on the emission side of the first image forming unit 1100, for example.

Although in each of the embodiments, the lighting device having the light emission tube is used as the lighting device, the invention in not thus limited thereto. As the lighting device, a solid-state light source such as a light emitting diode (LED) or a semiconductor laser (LD) can also be used.

Although in each of the embodiments, the light modulation element having a transmissive liquid crystal panel is used as the light modulation element, the invention in not thus limited thereto. A light modulation element having a reflective liquid crystal panel can also be used.

Although in each of the embodiments, the light modulation element having the liquid crystal panel is used as the light modulation element, the invention in not thus limited thereto. A micromirror light modulation element can also be used.

The invention can be applied to a front projection projector for performing projection from the side of observing the projection image, and also to a rear projection projector for performing projection from the side opposite to the side of observing the projection image.

What is claimed is:

1. A projector comprising:
a lighting device for emitting light including a first colored light beam, a second colored light beam, and a third colored light beam;
a first color separation optical system including
a first dichroic mirror, which separates the light from the lighting device into the first colored light beam and the other colored light beams by reflecting the light in a certain wavelength range and transmitting the light in another wavelength range out of the light from the lighting device, and
a second dichroic mirror, which separates the other colored light beams into the second colored light beam and the third colored light beam by reflecting the light in a certain wavelength range and transmitting the light in another wavelength range out of the other colored light beams separated by the first dichroic mirror, thereby separating the light from the lighting device into the first through the third colored light beams;
first through third light modulation elements respectively modulating the first through the third colored light beams separated by the first color separation optical system;
a first color combining optical system for combining the first through the third colored light beams respectively modulated by the first through the third light modulation elements to emit a first image light beam;
a second color separation optical system including
a third dichroic mirror, which separates the light from the lighting device into the first colored light beam and the other colored light beams by reflecting the light in a certain wavelength range and transmitting the light in another wavelength range out of the light from the lighting device, and
a fourth dichroic mirror, which separates the other colored light beams into the second colored light beam and the third colored light beam by reflecting the light in a certain wavelength range and transmitting the light in another wavelength range out of the other colored light beams separated by the third dichroic mirror, thereby separating the light from the lighting device into the first through the third colored light beams;
fourth through sixth light modulation elements respectively modulating the first through the third colored light beams separated by the second color separation optical system;
a second color combining optical system for combining the first through the third colored light beams respectively modulated by the fourth through the sixth light modulation elements to emit a second image light beam;
a polarization combining optical system for combining the first image light beam emitted from the first color combining optical system and the second image light beam emitted from the second color combining optical system; and
a projection optical system for projecting the image light beam combined by the polarization combining optical system,
the projector being configured so that the colored light beam one of reflected and transmitted in a near side area along the lighting beam axis in the first dichroic mirror and the colored light beam one of reflected and transmitted in a near side area along the lighting beam axis in the third dichroic mirror are projected on a projection screen in a laterally reversed manner regarding each of the first through the third colored light beams, and
the projector is configured so that the colored light beam one of reflected and transmitted in a near side area along the lighting beam axis in the second dichroic mirror and the colored light beam one of reflected and transmitted in a near side area along the lighting beam axis in the fourth dichroic mirror are projected on the projection screen in a laterally reversed manner regarding each of the first through the third colored light beams.

2. The projector according to claim 1, further comprising:
a polarization splitting optical system for splitting the light from the lighting device into a light beam having a first polarization component and a light beam having a second polarization component;
a first light guiding optical system for guiding the light beam having the first polarization component, which is separated by the polarization splitting optical system, to the first color separation optical system; and
a second light guiding optical system for guiding the light beam having the second polarization component, which is separated by the polarization splitting optical system, to the second color separation optical system.

3. The projector according to claim 1,
the lighting device including a first lighting device for emitting a light beam having a first polarization component towards the first color separation optical system, and a second lighting device for emitting a light beam having a second polarization component towards the second color separation optical system.

4. The projector according to claim 1, further comprising:
a first group including:
the first color separation optical system,
the first through the third light modulation elements, and
the first color combining optical system,
a second group including:
the second color separation optical system,
the fourth through the sixth light modulation elements, and
the second color combining optical system; and
the first group, the second group and the polarization combining optical system being disposed on substantially the same plane.

5. The projector according to claim 4,
the first color separation optical system being configured such that the first dichroic mirror reflects the first colored light beam and transmits the other colored light beams, and the second dichroic mirror reflects the second colored light beam and transmits the third colored light beam, and the second color separation optical system being configured such that the third dichroic mirror transmits the first colored light beam and reflects the other colored light beams, and the fourth dichroic mirror reflects the second colored light beam and transmits the third colored light beam.

6. The projector according to claim 5, further comprising:
a double-sided reflecting mirror disposed between the first dichroic mirror and the first light modulation element and between the fourth dichroic mirror and the sixth light modulation element, and having a surface for reflecting the first colored light beam reflected by the first dichroic mirror and a surface for reflecting the third colored light beam transmitted through the fourth dichroic mirror.

7. The projector according to claim 1, further comprising:
a first group including:
   the first color separation optical system,
   the first through the third light modulation elements, and
   the first color combining optical system and
a second group including:
   the second color separation optical system,
   the fourth through the sixth light modulation elements, and
   the second color combining optical system;
the first group and the second group being respectively disposed on different horizontal planes.

8. The projector according to claim 7, further comprising:
a reflecting mirror disposed one of between the first color combining optical system and the polarization combining optical system and between the second color combining optical system and the polarization combining optical system, and for reflecting one of the first image light beam emitted from the first color combining optical system and the second image light beam emitted from the second color combining optical system towards the polarization combining optical system.

9. An apparatus, comprising:
a lighting unit that emits light, the light including a first colored light beam, a second colored light beam, and a third colored light beam;
a polarization splitting optical system that splits the light from the lighting unit into a light beam having a plurality of polarization components;
a plurality of color separation optical systems, each of the plurality of color separation optical systems including:
   (i) a first dichroic mirror, which separates the light from the lighting device into the first colored light beam and the other colored light beams by reflecting the light in a certain wavelength range and transmitting the light in another wavelength range out of the light from the lighting device, and
   (ii) a second dichroic mirror, which separates the other colored light beams into the second colored light beam and the third colored light beam by reflecting the light in a certain wavelength range and transmitting the light in another wavelength range out of the other colored light beams separated by the first dichroic mirror, thereby separating the light from the lighting device into the first through the third colored light beams;
a plurality of light modulation units, each of the light modulation units corresponding to one of the plurality of color separation optical systems and including:
   (i) a first light modulation element that modulates the first colored light beam separated by the one of the plurality of color separation optical systems;
   (ii) a second light modulation element that modulates the second colored light beam separated by one of the plurality of color separation optical systems;
   (iii) a third light modulation element that modulates the third colored light beam separated by the one of the plurality of color separation optical systems;
a plurality of color combining optical systems, each of the plurality of color combining systems combines the first through the third colored light beams respectively modulated by the first through the third light modulation elements of a corresponding light modulation unit of the plurality of light modulation units, and each of the plurality of color combining systems emits an image light beam;
a plurality of light guiding optical systems that guide light beams, each of the plurality of light guiding optical systems guides light respectively corresponding to one of the plurality of polarization components to a corresponding color separation optical system of the plurality of color separation optical systems;
a polarization combining optical system for combining the image light beams emitted from each of the plurality of color combining systems;
a projection optical system for projecting the image light beam combined by the polarization combining optical system,
the apparatus being configured such that the colored light beam one of reflected and transmitted in a near side area along the lighting beam axis in the first dichroic mirror of a first color separation optical system, of the plurality of color separation system, and the colored light beam one of reflected and transmitted in a near side area along the lighting beam axis in the first dichroic mirror of a second color separation optical system, of the plurality of color separation system, are projected on a projection screen in a laterally reversed manner regarding each of the first through the third colored light beams, and
the apparatus being configured such that the colored light beam one of reflected and transmitted in a near side area along the lighting beam axis in the second dichroic mirror the first color separation optical system, of the plurality of color separation system, and the colored light beam one of reflected and transmitted in a near side area along the lighting beam axis in the second dichroic mirror of the second color separation optical system, of the plurality of color separation system, are projected on the projection screen in a laterally reversed manner regarding each of the first through the third colored light beams.

10. A projector comprising:
a lighting device for emitting light including a first colored light beam, a second colored light beam, and a third colored light beam;
a first color separation optical system including
   a first dichroic mirror, which separates the light containing first to third color light components from the lighting device into a light beam containing one of the three color light components and a light beam containing the other two color light components by reflecting the light in a certain wavelength range and transmitting the light in another wavelength range out of the light from the lighting device, and
   a second dichroic mirror, which separates the light beam that has been separated by the first dichroic mirror and contains the other two color light components by reflecting the light in a certain wavelength range and transmitting the light in another wavelength range out of the light beam containing the other two color components separated by the first dichroic mirror, thereby separating the light from the lighting device into the first through the third colored light beams;

first through third light modulation elements respectively modulating the first through the third colored light beams separated by the first color separation optical system;

a first color combining optical system for combining the first through the third colored light beams respectively modulated by the first through the third light modulation elements to emit a first image light beam;

a second color separation optical system including
- a third dichroic mirror, which separates the light containing the first to third color light components from the lighting device into a light beam containing one of the three color light components and a light beam containing the other two color light components by reflecting the light in a certain wavelength range and transmitting the light in another wavelength range out of the light from the lighting device, and
- a fourth dichroic mirror, which separates the light beam that has been separated by the third dichroic mirror and contains the other two color light components by reflecting the light in a certain wavelength range and transmitting the light in another wavelength range out of the light beam containing the other two color components separated by the third dichroic mirror, thereby separating the light from the lighting device into the first through the third colored light beams;

fourth through sixth light modulation elements respectively modulating the first through the third colored light beams separated by the second color separation optical system;

a second color combining optical system for combining the first through the third colored light beams respectively modulated by the fourth through the sixth light modulation elements to emit a second image light beam;

a polarization combining optical system for combining the first image light beam emitted from the first color combining optical system and the second image light beam emitted from the second color combining optical system; and a projection optical system for projecting the image light beam combined by the polarization combining optical system, wherein the projector is configured so that the colored light beam one of reflected and transmitted in a near side area along the lighting beam axis in the first dichroic mirror and the colored light beam one of reflected and transmitted in a near side area along the lighting beam axis in the third dichroic mirror are projected on a projection screen in a laterally reversed manner regarding each of the first through the third colored light beams, and the projector is configured so that the colored light beam one of reflected and transmitted in a near side area along the lighting beam axis in the second dichroic mirror and the colored light beam one of reflected and transmitted in a near side area along the lighting beam axis in the fourth dichroic mirror are projected on the projection screen in a laterally reversed manner regarding each of the first through the third colored light beams.

11. The projector according to claim 1, wherein the first color combining optical system includes a first dichroic prism that performs color composition, and the second color combining optical system includes a second dichroic prism that performs color composition.

12. The apparatus according to claim 9, wherein each of the plurality of color combining optical systems includes a dichroic prism that performs color composition.

* * * * *